United States Patent [19]
Roberts

[11] Patent Number: 5,768,619
[45] Date of Patent: Jun. 16, 1998

[54] METHOD AND SYSTEM FOR ENABLING AND DISABLING FUNCTIONS IN A PERIPHERAL DEVICE FOR A PROCESSOR SYSTEM

[75] Inventor: David G. Roberts, Fremont, Calif.

[73] Assignee: Advanced Micro Devices, Inc., Sunnyvale, Calif.

[21] Appl. No.: 602,640

[22] Filed: Feb. 16, 1996

[51] Int. Cl.⁶ .................................................. G06F 15/02
[52] U.S. Cl. ............................................................ 395/830
[58] Field of Search ................................ 395/821, 822, 395/823, 826, 828, 829, 830

[56] References Cited

U.S. PATENT DOCUMENTS

| | | | |
|---|---|---|---|
| Re. 30,331 | 7/1980 | Sorensen et al. | 711/105 |
| 3,846,763 | 11/1974 | Riikonen | 395/890 |
| 3,950,735 | 4/1976 | Patel | 395/880 |
| 4,099,255 | 7/1978 | Stanley et al. | 395/735 |
| 4,435,766 | 3/1984 | Haber et al. | 395/726 |
| 5,138,610 | 8/1992 | Kohlmann et al. | 370/458 |
| 5,280,628 | 1/1994 | Nakayama | 395/733 |
| 5,625,807 | 4/1997 | Lee et al. | 395/560 |
| 5,657,293 | 8/1997 | Merritt et al. | 365/233.5 |
| 5,666,559 | 9/1997 | Wisor et al. | 395/852 |

*Primary Examiner*—Moustafa M. Meky
*Attorney, Agent, or Firm*—Sawyer & Associates

[57] ABSTRACT

Method and system aspects properly enable and disable a function in a peripheral device. In a system aspect, the system includes a processing system, and a control mechanism within the peripheral device and coupled to the processing system, the control mechanism controlling enabling and disabling of a function in the peripheral device. The control mechanism further includes a decoder coupled to the processing system, and a counter coupled to the decoder. In a method aspect, the method includes receiving first and second control signals at a control mechanism in the peripheral device from at least one component in the processing system, and maintaining a state of the peripheral device at a predetermined level according to a value of the control mechanism, wherein the first and second control signals alter the value of the control mechanism.

16 Claims, 3 Drawing Sheets

METHOD AND SYSTEM FOR ENABLING AND DISABLING FUNCTIONS IN A PERIPHERAL DEVICE FOR A PROCESSOR SYSTEM

FIELD OF THE INVENTION

The present invention relates to enabling peripheral functions, and more particularly to accurately enabling peripheral functions for maintaining consistency among multiple control operations.

BACKGROUND OF THE INVENTION

In typical computer systems, several control operations occur concurrently. Many of these control operations, or threads of execution, require the development of a specific set of uninterrupted steps in order to achieve a desired state. Oftentimes, during such critical operations, one thread of execution may disable a given function, such as disabling interrupts from a peripheral while the current interrupt is serviced, in order to more quickly finish its task before reenabling the function.

Tracking of the enabled/disabled state of a given function in a peripheral is typically performed via a dedicated bit in a system register. Thus, while the function is disabled, the dedicated bit reflects that state by an appropriate logic level, so that other threads are kept from performing tasks with the peripheral. While this normally maintains proper operation in a single processor system, computer systems with more than a single processor require more careful control.

With multi-processor systems, more than one sequence may be disabling and reenabling functions in a single peripheral device. A typical way of handling such situations is to use synchronization objects within the processing system and manipulate these objects through operating system API (application program interface) calls.

For example, semaphore objects have sometimes been used as synchronization objects. Typically, threads of execution must first make a call to the operating system to try and acquire the semaphore object and then the system either grants or denies ownership of the object to the threads. The operating system ensures that only one thread has ownership of the object at any one time, and only the thread with ownership can release that ownership. Thus, access to a global variable that would reflect the state of the dedicated enable/disable bit would sometimes be associated with a semaphore object to ensure that two threads do not try to disable and then re-enable functions before each has finished its task.

Semaphore objects are also typically employed to control access to mechanisms within a processor. For example, some "windowing" operating systems, e.g., Microsoft Windows™3.x, utilize a counter in a memory location to control display of a mouse cursor. In a multiple processor environment, access to the counter memory location would require the use of a semaphore object to ensure that there is no interference.

Unfortunately, although synchronization objects do ensure a lack of interference, their implementation through the operating system slows down the operation. Further, the use of global variables complicates the code for driving the peripheral. Such complications along with the calls to the operating system and a requisite execution of many instructions reduce overall operating performance.

A need exists for a faster, more efficient and direct form of maintaining coherent operations with peripheral devices in a processing system. The present invention addresses such a need.

SUMMARY OF THE INVENTION

The present invention provides method and system aspects to properly enable and disable a function in a peripheral device. In a system aspect, the system includes a processing system, the processing system comprising at least one central processing unit (CPU), and a control mechanism within the peripheral device and coupled to the processing system, the control mechanism for controlling enabling and disabling of a function in the peripheral device. The control mechanism further includes a decoder coupled to the processing system, and a counter coupled to the decoder.

In one aspect, the decoder decodes first and second command signals from the processing system into disable and enable strobes. In a further aspect, the counter increments due to the disable strobe and decrements due to an enable strobe.

In a method aspect, the method includes receiving first and second control signals at a control mechanism in the peripheral device from at least one component in the processing system, and maintaining a state of the peripheral device at a predetermined level according to a value of the control mechanism, wherein the first and second control signals alter the value of the control mechanism.

In one aspect, maintaining the state further includes disabling the function in the peripheral device when the value of the mechanism is not equal to a predetermined value. In a further aspect, the predetermined value is a zero value.

With the present invention, an efficient and straightforward system for maintaining consistency in the control of function in a peripheral device among a plurality of execution threads is achieved. Further, the utilization of the present invention within a peripheral device itself increases the flexibility by allowing use with multiple forms of processors. These and other advantages of the aspects of the present invention will be more fully understood in conjunction with the following detailed description and accompanying drawings.

DETAILED DESCRIPTION

The present invention relates to improving the maintenance of proper functioning in peripheral devices in both single and multi-processor systems. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
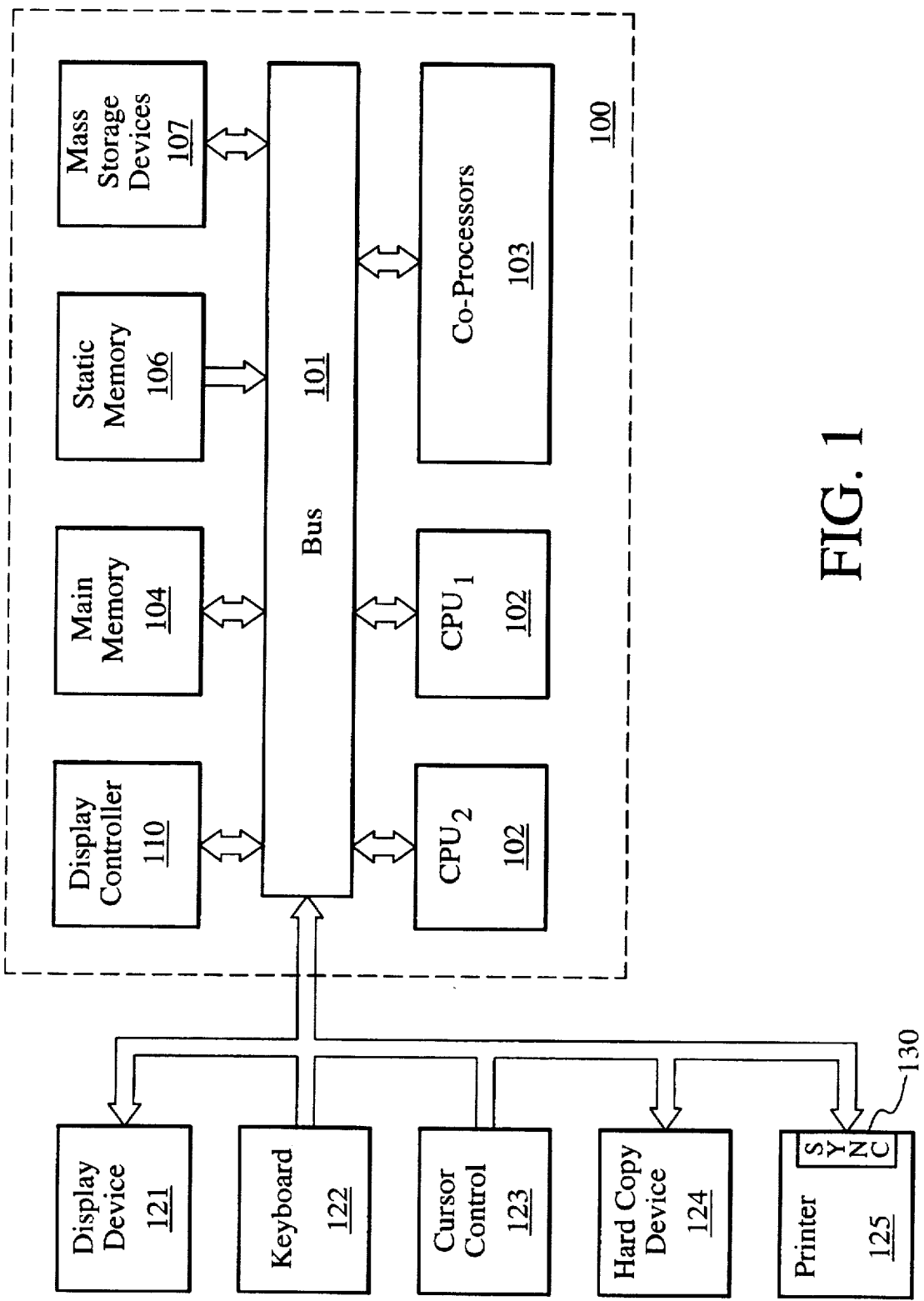
FIG. 1 illustrates a block diagram of a processing system that includes a counter circuit within a peripheral device in accordance with the present invention.

Referring to FIG. 1, a computer system 100 suitable for the present invention includes a bus 101 for internal transmission of digital data. Of course, bus 101 is preferably atomic, i.e., only one transaction can occur on the bus at one time. At least one central processing unit (CPU) 102 is coupled to bus 101 and processes digital data information. A plurality of co-processors 103 are also optionally coupled to the bus 101 for additional processing power and speed.

Random access memory (RAM) or main memory 104 is also coupled to bus 101. Main memory 104 suitably stores information and instructions executed by CPU 102. Main memory 104 further stores temporary variables and other intermediate information during execution of instructions by CPU 102, as is well appreciated by those skilled in the art. Read only memory (ROM) or other form of static storage device 106 is also included and coupled to bus 101. ROM 106 preferably stores static information and instructions for CPU 102. Other storage devices 107, such as a hard disk drive, a floppy disk drive, etc., are also suitably included for storing information and instructions and are coupled to bus 101.

Further included in computer system 100 is a display controller 110. Display controller 110 interfaces computer system 100 to a display device 121, such as a cathode ray tube (CRT), via the bus 101. The display device 121 suitably displays information to a computer user. Further included for a user are an alphanumeric input device 122, such as a keyboard, and cursor control device 123 such as a mouse, joystick, trackball or touch pad, etc. Use of cursor control device 123 allows movement and selection of objects or data visible on the display device 121.

By way of example, in accordance with the present invention, a counter circuit 130 is included in a peripheral device, such as a printer 125. System operation in conjunction with the counter circuit 130 is described with reference to the FIG. 2, and a circuit diagram for the counter circuit 130 is presented in more detail with reference to FIG. 3.

Figure 2:
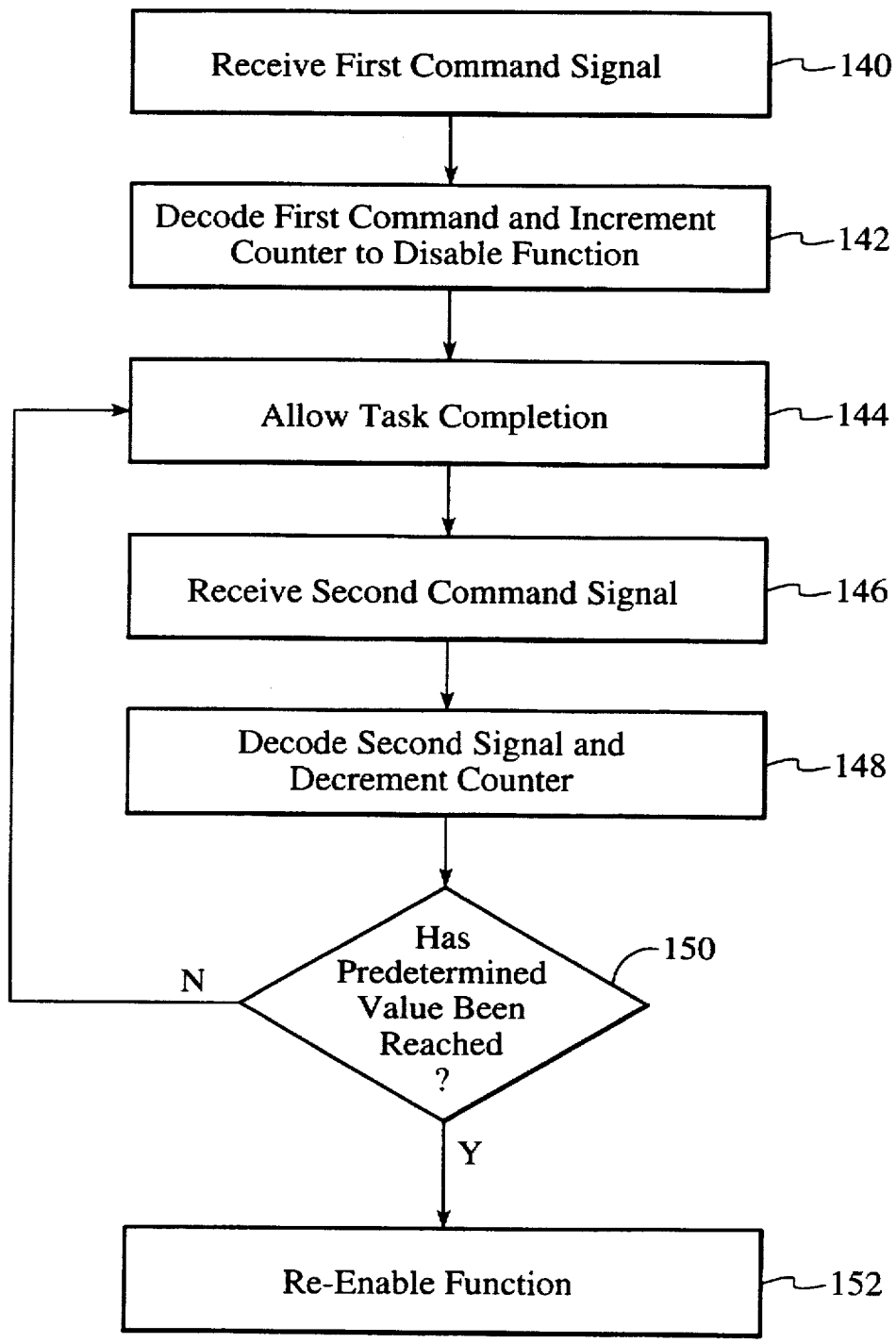
FIG. 2 illustrates system operation in conjunction with the counter circuit of FIG. 1.

Referring to FIG. 2, a flow diagram presents a sequence for utilizing the counter circuit 130 in accordance with a preferred embodiment of the present invention. To the system component, the operations of counter circuit 130 within the peripheral device occur transparently. Thus, the sequence preferably initiates when a system component, e.g., a software driver, sends a command to the peripheral to disable a particular function in the peripheral. By way of example, a write command with a given data bit pattern to a register is suitable for disabling interrupts in the peripheral device. The peripheral device receives the disable function signal, via step 140. The disable function signal is decoded into a disable strobe which suitably causes a counter within counter circuit 130 to increment, via step 142. The system component then completes its sensitive function with the peripheral, via step 144.

After completing its task, the component is ready to re-enable the function of the peripheral device, and thus, the peripheral receives a second command signal, i.e., an enable function signal, from the system component, via step 146. The second command signal is decoded as an enable strobe which suitably causes the counter to decrement, via step 148. At this point, the value of the counter is preferably checked to determine whether a predetermined value in the counter has been reached, via step 150. The predetermined value preferably indicates whether all of the disable strobes have been reversed with an enable strobe. With the incrementing and decrementing as described above, the predetermined value is preferably a zero value. If the predetermined value has been reached, an ENABLE signal, e.g., a high logic level output signal, is output from the counter to indicate reenablement of the function in the peripheral, via step 152. The sequence then returns to step 140 to await a next disable function signal.

When the predetermined value has not been reached, there is at least one system component which has not completed its task and thus has not re-enabled the function in the peripheral device. Thus, the operations return to step 144 to allow the next system component to complete its sensitive operation with the peripheral device.

Figure 3:
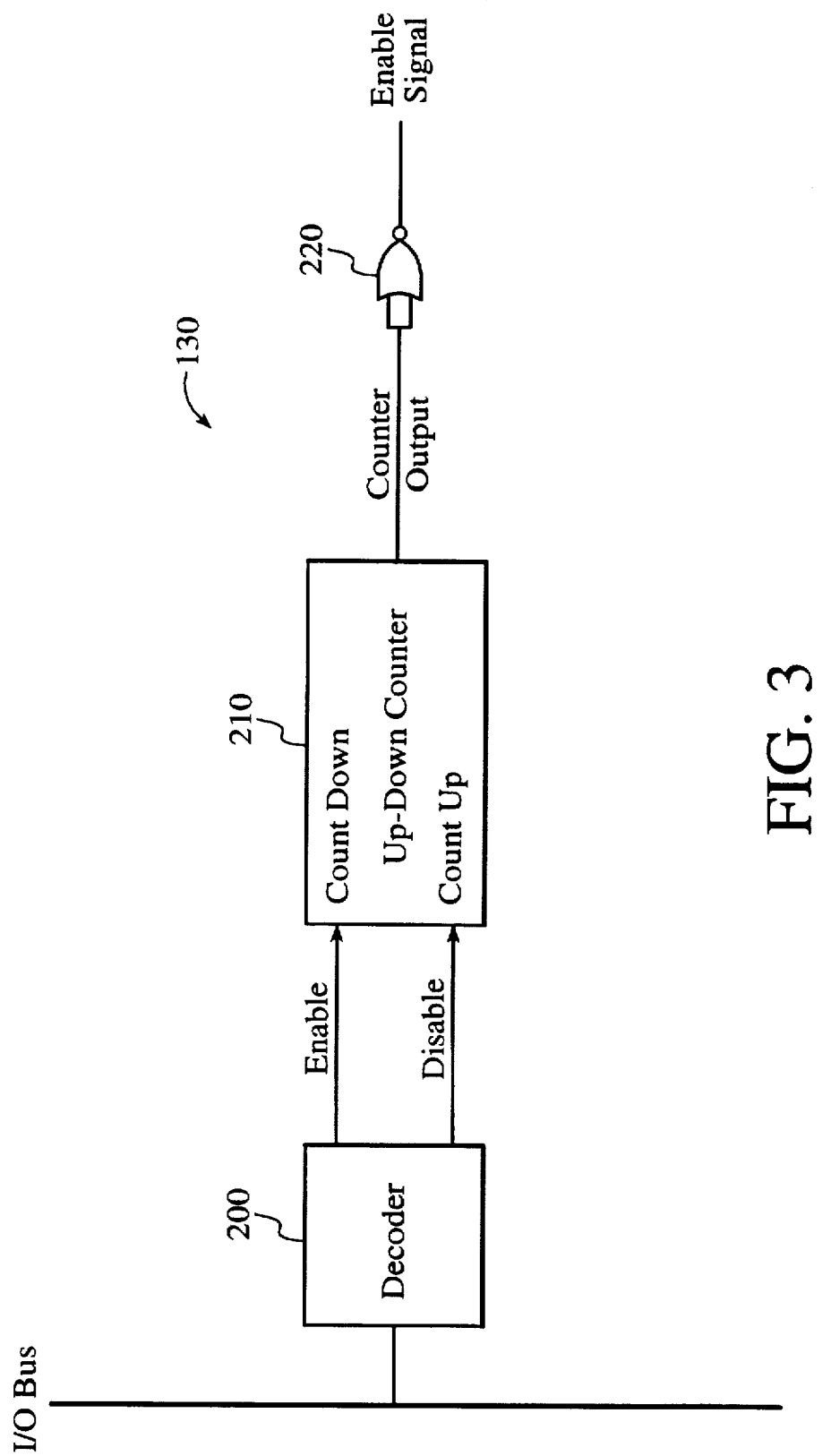
FIG. 3 illustrates a circuit diagram for the counter circuit in more detail.

A counter circuit 130 for achieving the sequence of FIG. 2 in accordance with a preferred embodiment of the present invention is illustrated in FIG. 3. Preferably, the counter circuit 130 is placed within the I/O or peripheral device itself, as shown in FIG. 1. The circuit 130 preferably includes a decoder 200 coupled to the input/output system bus 101 (FIG. 1). The decoder 200 is further coupled to an up-down counter 210. The counter 210 receives from the decoder 200 an enable strobe at a first input and a disable strobe at a second input. The first input is suitably a count-down input, while the second input is suitably a count-up input. The decoder 200 preferably acts to decode I/O writes to a register, i.e., preferably decodes the first and second command signals of the system component, and creates the corresponding enable and disable strobes to appropriately manipulate the counter 210. The register may suitably be provided by a system register, as is well understood by those skilled in the art.

The output of counter 210 is suitably coupled to the input of a NOR gate 220. NOR gate 220 preferably outputs an ENABLE signal, e.g., a high logic level signal, to allow the peripheral device to be enabled. As described with reference to FIG. 2, the ENABLE signal is preferably at a high logic level when the output of the counter is at a predetermined value, e.g., a zero value.

Of course, counter 210 could also be implemented in other manners without departing from the spirit and scope of the present invention. For example, the incrementing and decrementing of the counter could be implemented by reversing the inputs of the enable and disable strobes. Further, the ENABLE signal could decode the counter as any particular desired value and even a value range, other than the zero value described. Of course, the logic level used for the ENABLE signal could be reversed as well, to utilize a low logic level as the ENABLE signal output, as is well understood by those skilled in the art. Further, the counter could be implemented to provide counting done by a desired value, including one's, two's, or two's complement.

The applicability of the present invention to a processing system is easily demonstrated with reference to a situation in which a network card allows more than one thread to concurrently process both transmit and receive frames. During such situations, potential conflict over the state of the interrupt enable bit would typically occur. However, with the present invention, such potential conflict is alleviated, as described in the following example.

By way of example, a first transmit thread, TX, suitably disables interrupts by writing a first or "disable" command to a system command register. The decoder 200 suitably translates the first command into a disable strobe, and starting with counter 160 at a zero value, the counter 160 increments by one and interrupts are disabled. However, a frame reception signal interrupt had already been generated but not yet processed. The processor then acknowledges the previously pending receive, RX thread interrupt and switches to the RX thread. The RX thread disables interrupts again by writing the "disable" command to the command register and then continues to process the receive frame. When the RX thread writes the "disable" command, again the signal is appropriately translated, and the counter 160 increments by one to a value of two.

Upon completion of its sensitive task, the TX thread tries to re-enable interrupts. It therefore writes a second or "enable" command signal, and the decoder 200 translates the signal to an enable strobe for the counter 160. The counter 160 suitably decrements by one. However, because the counter value is still greater than zero due to the RX thread, the interrupts are disabled. Thus, the RX thread continues its task while interrupts are still properly disabled. When the RX thread is finished, it writes an "enable" command, the command is translated into an enable strobe, and the counter 160 decrements by one. Since no other threads have disabled interrupts, the counter 160 is again at its predetermined, e.g. zero value, and interrupts are now fully re-enabled.

As demonstrated with this example, multiple threads of execution accurately perform sensitive tasks/critical functions with a peripheral device without risk of interference. The peripheral device employing the counter circuit of the present invention is easily maintained in a proper functioning state without the use of time-consuming operation system calls. Further, with the use of the counter circuit in the peripheral device itself, the counter circuit also provides straightforward functioning transparently in multiple processor system environments.

Although the present invention has been described in accordance with the embodiments shown, one of ordinary skill in the art will recognize that there could be variations to the embodiment and those variations would be within the spirit and scope of the present invention. For example, although particular signals have been described with reference to particular logic levels for use with particular circuit components, they are meant to be illustrative. Thus, other circuits and logic combinations may be designed to achieve the functions of the present invention, and these are within the scope of the present invention. Accordingly, many modifications may be made by one of ordinary skill without departing from the spirit and scope of the present invention, the scope of which is defined by the following claims.

What is claimed is:

1. A system for properly enabling and disabling a function in a peripheral device, the system comprising:

a processing system, the processing system comprising at least one central processing unit (CPU): and a control mechanism comprising a decoder within the peripheral device and coupled to the processing system for controlling enabling and disabling of a function in the peripheral device.

2. The system of claim 1 wherein the control mechanism further comprises a counter coupled to the decoder.

3. The system of claim 2 wherein the decoder decodes first and second command signals from the processing system into disable and enable strobes.

4. The system of claim 3 wherein the counter increments due to the disable strobe.

5. The system of claim 3 wherein the counter decrements due to an enable strobe.

6. The system of claim 2 wherein a zero value in the counter enables the function in the peripheral device.

7. The system of claim 2 wherein a non-zero value in the counter disables the function in the peripheral device.

8. A method for properly enabling and disabling a function in a peripheral device of a processing system, the method comprising:

receiving first and second control signals at a control mechanism in the peripheral device from at least one component in the processing system; and maintaining a state of the peripheral device at a predetermined level according to a value of the control mechanism, wherein the first and second control signals alter the value of the control mechanism.

9. The method of claim 8 further comprising the step of decoding a first control signal as a disable strobe.

10. The method of claim 9 further comprising incrementing a counter in the control mechanism due to the disable strobe.

11. The method of claim 8 further comprising the step of decoding a second control signal as an enable strobe.

12. The method of claim 11 further comprising decrementing a counter in the control mechanism due to the enable strobe.

13. The method of claim 8 wherein the step of maintaining further comprises disabling the function in the peripheral device when the value of the mechanism is not equal to a predetermined value.

14. The method of claim 13 wherein the predetermined value is a zero value.

15. The method of claim 8 wherein the step of maintaining further comprises disabling the function in the peripheral device when the value of the mechanism is equal to a predetermined value.

16. The method of claim 15 wherein the predetermined value is a zero value.

* * * * *